United States Patent [19]

McCorkle et al.

[11] 4,042,827
[45] Aug. 16, 1977

[54] STIMULATED EMISSION X-RAY GENERATOR

[75] Inventors: Richard A. McCorkle, South Salem, N.Y.; James M. Joyce, Greenville, N.C.

[73] Assignee: Research Corporation, New York, N.Y.

[21] Appl. No.: 581,945

[22] Filed: May 29, 1975

Related U.S. Application Data

[63] Continuation-in-part of Ser. No. 402,900, Oct. 3, 1973, abandoned.

[51] Int. Cl.² .............................................. G21G 4/00
[52] U.S. Cl. ................................................. 250/493
[58] Field of Search ............... 250/493, 492, 503, 510, 250/505; 331/94.5 F, 94.5 Z

[56] References Cited

U.S. PATENT DOCUMENTS

| | | | |
|---|---|---|---|
| 3,233,107 | 2/1966 | Senett | 250/493 |
| 3,234,099 | 2/1966 | Baldwin et al. | 250/493 |
| 3,388,314 | 6/1968 | Gould | 250/493 |
| 3,557,370 | 1/1971 | Pickenbrock | 250/493 |
| 3,617,939 | 11/1971 | Bond et al. | 250/493 |
| 3,813,555 | 5/1974 | Viccelli | 250/493 |
| 3,823,325 | 7/1974 | Wood | 250/493 |
| 3,835,330 | 9/1974 | Baker et al. | 250/493 |
| 3,870,882 | 5/1975 | Larson | 250/493 |
| 3,882,312 | 5/1975 | Kepros et al. | 250/493 |

OTHER PUBLICATIONS

"Practicable X-Ray Amplifier", R. A. McCorkle, Phy. Review Letters, vol. 29, No. 15, Oct. 9, 1972, pp. 982-985.

*Primary Examiner*—Alfred E. Smith
*Assistant Examiner*—B. C. Anderson
*Attorney, Agent, or Firm*—Robert R. Keegan

[57] ABSTRACT

X-ray generation by stimulated emission of radiation is achieved from an ensemble of energized atoms with inner-shell vacancies, which ensemble of atoms is obtained in one example by the interaction of a beam swept at approximately the speed of light along the length of an extended interactant material providing an active region moving in synchronization with a resonant X-ray pulse traveling along the material.

6 Claims, 7 Drawing Figures

STIMULATED EMISSION X-RAY GENERATOR

This application is a continuation-in-part of Richard A. McCorkle and James M. Joyce, application Ser. No. 402,900, filed Oct. 3, 1973, for Stimulated Emission X-ray Generator abandoned.

Soon after the demonstration of laser action had made the potentialities of laser devices apparent, speculation arose concerning extending amplification by stimulated emission of radiation beyond the visible light frequencies through ultraviolet light frequencies into the X-ray region of the electromagnetic spectrum. However, prior proposals for X-ray lasers have not yielded promising approaches to the realization of X-ray laser action from a practical point of view. In addition to difficulties similar to those in achieving laser action at longer wavelengths, the X-ray laser utilizing a population inversion for stimulated emission of radiation requires an inversion between levels widely separated by an energy on the order of hundreds of electron volts.

Even assuming that one would first endeavor to achieve short pulses of directional X-rays generated by stimulated emission, the conditions for amplification of X-radiation by stimulated emission must never-the-less prevail for a time long enough to produce a sufficient, detectable number of stimulated X-ray photons.

The present invention provides a practicable system for overcoming the inherent difficulties in the problem of directional X-ray generation by stimulated emission. In the system of the invention, there is a complementary combination of a system producing the requisite pumping energy in a directable form such as a beam, and a geometry of the amplifying region of the generator such that the active region can be scanned along the X-ray generation path at light (and X-ray) propagation velocities.

As later described, the invention in preferred embodiments utilizes inverted populations in the X-ray region produced from selective inner-shell vacancies such as are obtained in intermediate energy ion-atom collisions. A beam swept at nearly the speed of light along the length of an extended interactant material provides an active region in synchronization with a resonant X-ray pulse traveling along the material.

While the first system considered here is one which involves a collision between a high velocity ion and a neutral atom, there are further systems which involve the collision of one ion with another ion. It should be understood, therefore, that either a collision between an ion and an atom or a collision between an ion and another ion may equally well be the basis of a system according to the present invention. For simplicity, such collisions are referred to as ion-atom collisions, whether the second collision partner be a neutral atom or another ion.

In a specific embodiment the large cross sections for selective production of atomic inner-sheel vacancies by heavy-ion bombardment at intermediate energies ($\sim 1$ keV/amu) of metal targets are utilized to advantage. The physical process is thought to be an electron promotion mechanism that occurs at level crossings in the quasimolecule formed during the collision, and/or rotational excitation. The vacancies produced may occur in the ion or the atom or both. Thus for ions passing through a thin foil, on the downstream side of the foil a significant number of ions will contain inner-shell vacancies. By choice of collision partners as well as beam energy and foil thickness, population inversions desired for particular applications will be achieved. Moreover, by sweeping the ion beam along the length of an extended target, such population inversions may be obtained in synchronism with a traveling wave front due to radiative decay of the states produced. Such a system will amplify this wave front advancing in the direction of sweep of the beam by stimulated emission. Systems of this nature would be useful X-ray sources when operated in a single-pass mode with no cavity. Such systems would of course also have great value when placed in a suitable X-ray laser resonant cavity. An X-ray resonant cavity in accordance with presently developed technology would likely be both cumbersome and expensive. However, advances are to be expected from proposals such as are now being investigated or as may be available at the time of instrumentation of such a cavity-including system.

For ion-atom combinations such that inner-shell energy levels of interest match, ion to atom, cross sections for the selective production of vacancies in these shells are given approximately by taking for the level-crossing radius a value equal to the sum of the radii of the two electronic shells involved. As a example, the match in energy between the carbon K shell and the argon L shell allows selective vacancies to be produced in the L shell of argon. In particular, measurements show that for bombarding energies below $\sim 80$ KeV effects of double L-shell excitation are not observed. Furthermore, it was found that at an ion energy of $\sim 50$ KeV, the resulting X-ray spectra indicated the strong predominance of the 224-eV line due to a 3s-2p transition. The radiative lifetime of this transition may be taken as $2.8 \times 10^{-11}$ sec and a fluorescence yield of $1.67 \times 10^{-3}$ is attainable.

It will be understood that, for understanding the invention in terms of an amplification phenomenon, it is expedient to consider the amplification that would be imparted to an input X-ray wave; this is probably not the most immediately useful application of the invention. Rather, it is expected that the invention will have as a first principal utility the generation of a directional X-ray beam. A highly directional beam of X-radiation (compared with previously known X-ray sources) will be generated by virtue of the sweeping of an active region for amplification by stimulated emission of radiation along an extended path at a velocity approximately equal to the velocity of light. In such case, the X-radiation amplified will be X-radiation emitted within the "input end" of the active region, by spontaneous emission for example.

Reference is made to additional explanatory material in articles by R. A. McCorkle and J. M. Joyce, "Practical X-ray Amplifier," by R. A. McCorkle, *Physical Review Letters*, Vol. 29, page 982, October, 1972; and "Threshold Conditions for Amplified Spontaneous Emission of X Radiation," *Physical Review A*, Vol. 10, page 903, September, 1974; and also the the numerous references thereto appended.

From the foregoing description it will be understood that the present invention provides a heretofore unavailable practicable system for producing amplification of X-radiation through the phenomenon of stimulated emission of radiation and which will provide, among other useful effects, the effect of generating X-radiation which is substantially more directional than that obtainable with previously known X-radiation sources; the generated radiation will generally also have substantial monochromaticity.

Apparatus according to the invention would find many uses, for example the more precise application of X-radiation to the human body for medical purposes.

In addition to providing advantages and utilities described above, it is an object of the present invention to provide apparatus in which there are produced an ensemble of excited particles in a region of predetermined geometry, such that X-radiation is amplified by stimulated emission in the region to produce a non-isotropic X-radiation emission.

It is another object of the present invention to produce an ensemble of highly excited particles in a region by the scanning of an interactant material with an interactant beam at approximately the velocity of light.

It is a further object of the present invention to produce an ensemble of excited particles in the manner described above, in which such particles form a medium with a population inversion, and in which the situs of the inverted population travels at approximately the speed of light so as to be in synchronism with an X-radiation pulse to be amplified by stimulated emmission.

It is a still further object of the present invention to provide apparatus in which a high-current ion beam is swept at nearly the speed of light along the length of an extended foil, whereby particles with inner-shell vacancies are produced in intermediate energy ion-atom collisions in an active region traveling in synchronization with a resonant X-ray pulse traveling parallel to the foil surface.

Other objects and advantages of the invention will be apparent from consideration of the following description in conjunction with the appendant drawings, in which.

Figure 1:
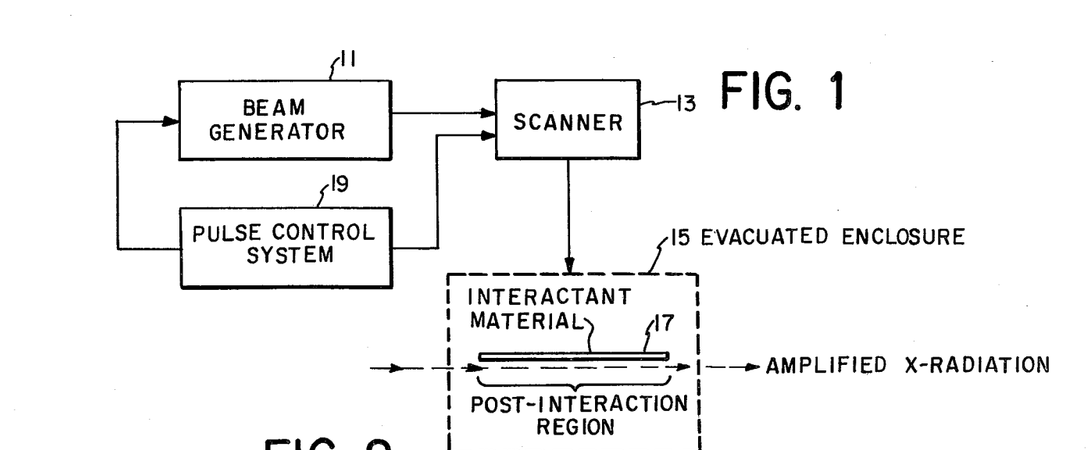
FIG. 1 is a schematic diagram of apparatus according to the invention, useful in explaining the general operation of the invention.

Referring specifically to FIG. 1, the basic elements of a system in accordance with the invention are illustrated. Energy for the amplification process is basically supplied by a beam generator 11. The nature of the beam generated by beam generator 11 is widely variable within the scope of the invention, it being necessary only that the beam is capable of being directed with moderately high energy density to interact with an interactant material to produce excited particles. Clearly such requirements may be met by a beam of ions, a beam of electromagnetic energy, or, perhaps, by a beam of uncharged particles.

The beam from beam generator 11 is directed by a scanner indicated at 13. The scanner 13 functions to direct the beam to the interactant material with which it is to interact, and to sweep the beam at a velocity approximately equal to the velocity of light. The scanner may also take a wide variety of forms, which will naturally be determined in part by the nature of the beam produced by the beam generator 11.

It should be particularly noted that the scanner 13 should not be considered only in terms of an electrostatic deflection apparatus such as in a cathode ray tube. The scanner 13 may control beam direction electrostatically, magnetically, electro-optically, or by use of any other phenomenon consistent with the nature of the beam from beam generator 11. Furthermore, the scanner 13 may form a part of and be essentially inseparable from the beam generator, as will be seen in the description of FIGS. 4 and 5 below.

The scanned beam from scanner 13 is directed to interact in an evacuated enclosure 15 with an interactant material 17. Obviously, the evacuated enclosure 15 may more conveniently also enclose the scanner 13 and/or the beam generator 11, particularly in the case of an ion beam electrostatically deflected by the scanner. Enclosure 15 may in some cases be partially evacuated or even pressurized.

Highly excited particles are produced by the apparatus of FIG. 1 due to the interaction of the beam and the interactant material. As a specific example, the post-interaction region in which X-radiation is amplified is shown on the downstream side of the beam from the interactant material. This is only a specific example, however; and the post-interaction region containing the excited particles may be upstream of the interactant material or within the interactant material as well.

In FIG. 1, the post-interactant region contains highly excited particles, typically ions with selective inner-shell vacancies as may be produced in intermediate-energy ion-atom collisions. The highly excited particles may also be produced by intense electromagnetic radiation or by plasma techniques. A pulse control system 19 is shown, which serves to synchronize the emission of the beam from the beam generator with the scanner 13 and provide other necessary control functions. At least in the early stages of the development of systems according to the invention, it is expressed that pulse operation will be conducted at a very low duty cycle, so that the system can be considered as if producing only a single pulse.

Figure 2:
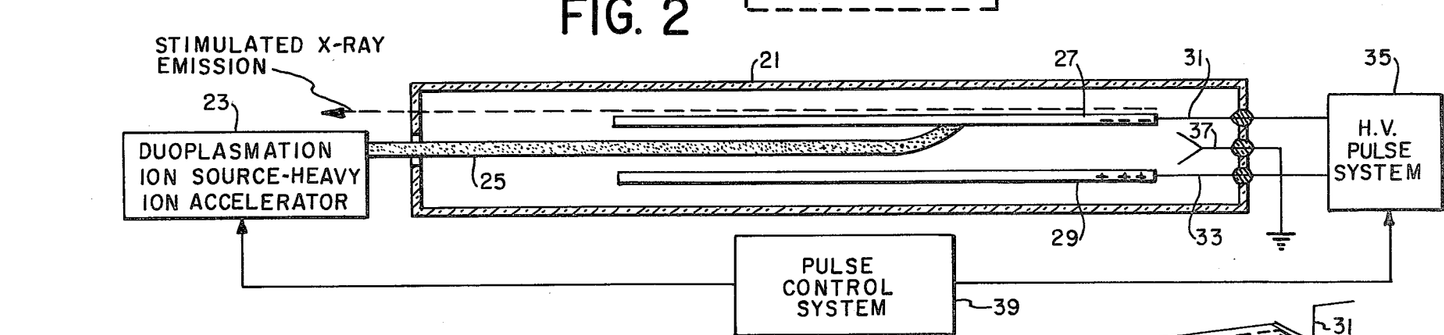
FIG. 2 is a sectional, partially schematic view of apparatus according to the invention in a specific form with a high current, electrostatically deflected ion beam interacting with a thin foil.

FIG. 2 shows a specific form of apparatus in accordance with the invention in detail. An enclosure 21 is provided, preferably of nonconductive material, which is evacuated by conventional apparatus (not shown). Enclosure 21 provides a drift space for an ion beam shown at 25 which is produced by a beam source 23. The beam source 23 may consist of a duoplasmatron ion source conventionally coupled with a heavy ion accelerator. In a typical case, the beam 25 will be generated with a current of 500 milliamperes and an energy of 30 kilovolts.

Beam 25 is swept parallel to its axis by an electrostatic deflection system including low potential plate 27 and high potential plate 29.

The pulse for causing deflection of beam 25 is provided by a high voltage pulse system 35, connected to plates 27 and 29 by leads 31 and 33, respectively. The pulse from the high voltage pulse system 35 will initially cause the beam 25 to impinge upon the plate 27 at the right end of the plate, as viewed in FIG. 2. As the high voltage pulse propagates along the transmission path provided by plates 27 and 29 at approximately the speed of light, the area of impingement of the beam 25 on plate 27 will move to the left, as explained in more detail hereinafter. A pulse control system 39 is provided to properly synchronize a pulsed output from the ion beam source 23 with a high voltage pulse from the high voltage pulse system 35. It may be noted that the illustration of the beam in FIG. 2 is not intended as a "stop action" depiction of the geometry of the beam. Rather, it shows the path of a group of particles emitted from the accelerator 23 at the same instant. This give a proper showing of the angle at which the particles strike the target and is an appropriate illustration to aid in the explanation of the calculation of the angle alpha. A stop motion illustration would not show a readily perceptible deflection of the beam because the velocity of the high-voltage pulse is so much higher than the beam particle velocities. A nearly imperceptible deflection of the beam would occur during the time that the high-voltage pulse traverses the full length of electrodes 27 and 29. A Faraday cage assembly of a conventional type employed with ion beam apparatus is shown schematically at 37.

The practical realization of such a system is aided by the existing availability of major components. State of the art heavy ion sources (such as the High Voltage Engineering DP240 duoplasmatron ion source) are capable of delivering heavy ions with current values well within the range mentioned here. Furthermore, source compatability with off-the-shelf ion beam accelerators (the High Voltage model LS-4 or LS-5) means that systems available on the market may be employed for the production of the beams discussed (the focusing employed would be tailored to the desired system).

The beam need only traverse distances on the order of approximately 2 meters of straight-line vacuum plumbing in the deflection scheme described. The deflection system may be loaded by discharging a suitable capacitor bank through standard ignitron switches or by means of the more recent solid dielectric switches. If the deflection plates are spaced a distance apart equal to their transverse height, the line impedance will be 377 ohms with a capacitance per unit length of 8.85 pf/meter. Thus, for a sweep of 1 meter, if potential loss of 1 part in $10^4$ is to be tolerated during the charging, a capacitor bank of less than 0.1 μfarads is sufficient. Requirements of purity and accurate thickness for foil material 42 are well within presently achievable limits. Such foils are currently being marketed as well as being readily fabricated in the laboratory by vacuum deposition. The most demanding fabrication requirement appears to be the extreme care demanded in mounting and aligning the foil in its holder. Fabrication requirements for such a holder are however within the bounds of machining capabilities in common use by manufacturers of precision optical systems. Additionally, an advantage can be had by mounting this section of the apparatus on a vibration isolation base. If one wished to avoid the alignment requirement, then design of the foil arrangement into an arrangement of several foils "back-to-back" with the subsequent small gap between them providing a region for the active medium is a quite suitable alternative. Here a greater ion beam energy may be employed and, of course, the X-ray pulse would suffer some absorption due to the possible presence of foil material along the line of sight. Integration of this system with additional system components, such as a ring cavity, could be achieved easily with standard vacuum plumbing parts with additional pumping stations as needed.

Figure 3:
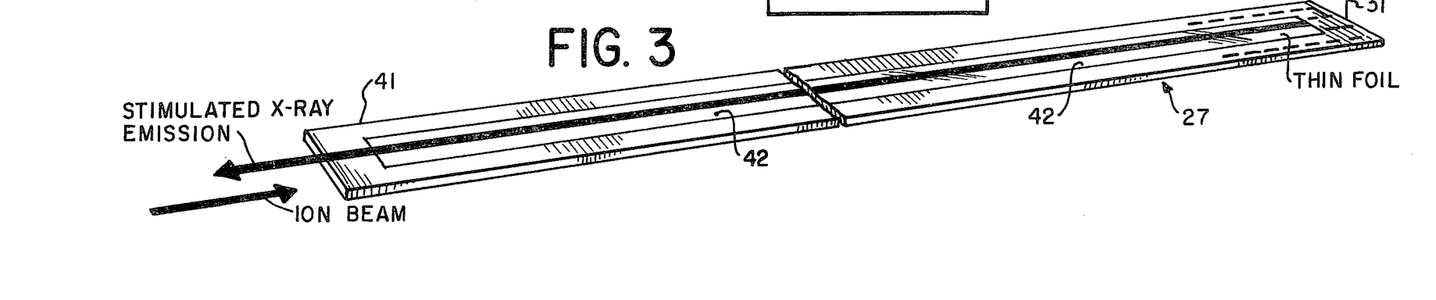
FIG. 3 is a perspective view of a detailed portion of the apparatus in FIG. 2.

The operation of the system of FIGS. 2 and 3 will be better understood by a more detailed consideration of the physical phenomenon involved in the operation. The system of FIG. 2 utilizes the beam-foil mechanism for the selective production of inner-shell vacancies. Recent investigations into the nature of the processes by which inner-shell vacancies are produced during intermediate energy (10's to 100's of KeV) collisions involving heavy ions and atoms have clearly revealed that the mechanism propounded in the "Fano-Lichten model," (Phys. Rev. Lett. 14,627 (1965)) namely the "promotion mechanism" of inner-shell electrons in the quasi-molecule formed during the collision as dictated by the exclusion principle, occurs due to level matching in the collision partners. The process may be understood in terms of the Landau-Zener theory of electron transitions at level crossings. By selecting appropriate ion-atom combinations such that inner-shell energy levels of interest match ion to atom, cross-sections for the selective production of vacancies in these shells may be obtained that are approximately given by taking for the level crossing radius a value equal to the sum of the radii of the two electronic shells involved. As an example, argon ions colliding with carbon atoms provide a match in energy between the carbon K-shell and the argon L-shell. Thus, selective vacancies may be produced in the L-shell of argon, in particular, similar collisions have revealed that for bombarding energies below $\sim$ 80 KeV the effects of double L-shell excitation are not observed. Furthermore, in this work, it was found that at an ion energy of $\sim$50 KeV, the resulting X-ray spectra clearly indicated the strong predominance of the 224-eV line due to a 3s→2p transition. The radiative lifetime of this transition may be expected to have a maximum value of $\sim 2.8 \times 10^{-11}$ sec and fluorescent yields on the order of $1.67 \times 10^{-3}$ may be expected from the theoretical calculations.

In FIG. 2 a relatively high current heavy ion beam 25 (for example, argon ions) is produced by a suitable ion source 23, internally focused and accelerated to the energy range of interest (30 to 500 KeV) and launched into a drift tube region of axial extent of about 2 M. provided by enclosure 21. Parallel to the beam and on each side of it are two parallel plates 27 and 29 which form a transmission system for a deflection pulse which is to be applied from the downstream end of the system. These plates serve the purpose of an extended electrostatic deflection system. A high voltage pulse of 20 to 50 KV applied to this electrode arrangement travels in the upstream direction with respect to the beam (to the left in FIG. 2) at a linear rate of approximately the speed of light. At a well defined and constant distance behind this advancing wave front, the deflected stream intersects the front face plane of the slotted low potential plate 27 which supports a thin foil 42 on its rear face as seen in FIG. 3. On the back side of this foil there is created a thin layer of ions with selected inner-shell vacanices due to the collisional mechanism described above and in the literature on X-ray spectroscopy. The foil thickness, beam energy, excitation cross-sections, and excited state lifetimes are chosen to produce the population inversion for amplifying the particular X-ray wavelengths of interest.

This region of excited states will have a geometrical cross-section in the plane of the foil of approximately the area of the beam intersection with the foil and it will travel in the upstream direction at a linear rate of approximately the speed of light. A substantial fraction of the excited states produced (as well as perhpas many of the unexcited ions emerging from the foil) may be obtained in an aligned condition. By supplying large beam current and control of other parameters in accordance with beam-foil spectroscopy techniques, these excited states can be produced in more than sufficient numbers to provide a significant line-of-sight amplification for a resonant X-ray pulse originating near the terminal end of the tube and proceeding along the top side of the foil in the upstream direction. Then a coherent amplification of this signal will occur and an enhanced output of directional X-radiation will be obtained on the chosen X-ray line.

A discussion of specific parameter values and the calculations for determination of such values follows. As an example, consider a system in which a 30 KV argon ion beam generator launches a collimated beam parallel to the deflection plates and is subsequently deflected by a pulse such that the beam changes potential energy by 20 KeV due to motion transverse to the original beam direction. From dynamical considerations, the beam will then intersect the foil a distance of $2l\sqrt{f}\, V_{bo}/V_d$ downstream from the position of the advancing wavefront. Here, $l$ is the parallel plate separation distance, $V_{bo}$ the undeflected beam voltage, $V_d$ the deflection voltage, and $f$ the fractional distance the undeflected beam is from the plate housing the foil. Thus for $V_{bo} = 30$ KV, $V_d = 40$ KV, and $f = \frac{1}{2}$, the downstream distance is $1.2\, l = 6$ cm for a characteristic plate separation of 5 cm. The beam will then intersect the foil with the beam making an angle of $\alpha$ with the foil surface where $\sin \alpha = \sqrt{20/50}$, since the beam energy will be 50 KeV at this point. Then $\alpha = 39°$. For a carbon foil of appropriate thickness, for example, 5μg/cm$^2$, the apparent thickness to the beam will be $5\mu g/cm^{2/\sin \alpha}$, or 7.79 μg/cm$^2$.

The following calculations provide an estimate of the fraction of excitations that may be expected to lead to excited states on the back side of the foil and hence the effect of parameter values on system function. As the ions traverse the foil, the number of excitations per unit time occurring in a distance between $x$ and $x + dx$ into the foil is $Ndx/\lambda$ where $N = N_{oe}^{-x\lambda}$, $N_o$ is the number of ions incident per unit time, and $\lambda = 1/N_f\sigma^*$ is the mean free path for inner-shell excitation, $\sigma^*$ being the cross-section for this process and $N_f$ the atomic density of the foil. The probability that these excited ions exit the back side of the foil in such a state is $\sim \exp[-(t_b-x)/v_b\tau] \cdot \exp[-(t_b-x)/\lambda]$, the first factor being due to the exponential decrease in population due to spontaneous decay (both Auger and radiative) with a lifetime $\tau$, the ion having a speed $v_b$, the second factor being due to subsequent atom-ion collisions leading to large angle scattering and hence loss from the excited beam. The mean free path for the latter process is taken to be that for inner-shell excitation, an approximation valid due to the screened Coulomb nature of the scattering interaction and the distance of closest approach needed for inner-shell excitations. Then the fractional excitation obtained on the exit side of the foil is $$\frac{N^*}{N_o} = v_b\tau\lambda^{-1}\exp\left[-\frac{t_b}{\lambda}\right]\left[1 - \exp\frac{-t_b}{v_b\tau}\right].$$

This ratio may be maximized by choosing $t_b = t_{bm} = v_b\tau \ln_{(1 + \lambda/v_b\tau)}$. With $N_f \simeq 1.13 \times 10^{23}$ atoms/cm$^3$ for carbon, $\sigma_{AR^+ \text{ on}}\cdot C = 0.795 \times 10^{-18}$ cm$^2$, $\tau \simeq \Delta t_{auger} = 3.84 \times 10^{-14}$ sec, and $v_b = 4.90 \times 10^7$ cm/sec at 50 KeV primary beam energy; $t_{bm} \simeq 8.6$ g/cm$^2$ thus requiring the foil thickness specified above. The fraction of useful excitations for the selected parameter values then becomes $\sim \frac{1}{8}$. This ratio may be improved (up to values $\sim e^{-1}$), by increasing the primary beam energy (consequently decreasing $\lambda$ and increasing $v_b$). At 50 KeV, the range of Ar$^+$ on C is $10.4 \pm 2.7$ μg/cm$^2$. Should this range be unsatisfactory, a small increase in energy values could easily remove any difficulty.

The total number of excited states existent at any one time is $N^* \simeq R \cdot \Delta t_{auger}$ where $R$ is the production rate. Due to the efficiency of the deflection scheme, a large number of beam particles intersect the foil per unit time. In particular, the point of intersection of the beam with the foil travels a distance of 1 meter in a time 1m/c and during this time the number of particles intersecting the foil will be the number of beam particles per meter of length, $N_{b\lambda}$, plus the number of beam particles that advance across an arbitrary position in the undeflected beam during this time, $N_{b\lambda}v_b/c$. Since in the example under consideration roughly $\frac{1}{8}$ of these lead to useful excitations (i.e., excitations that exit the back side of the foil), then the useful production rate is $$\frac{\frac{1}{8} N_l\lambda\left[1 + \frac{v_b}{c}\right]}{\left(\frac{1m}{c}\right)} = \frac{I_b c}{8ev_b} \times (1 + \frac{v_b}{c}).$$

Utilizing state of the art duoplasmatron ion sources, 500 mA argon ion beams at 30 KV are relizable. Then $R = 3.09 \times 10^{20}$ sec$^{-1}$ and $N^* \simeq 1.19 \times 10^7$ excited states. In the time $\Delta t_{auger}$, the beam is swept a distance $c\, t_{auger} \simeq 1.15 \times 10^{-2}$ mm. Thus, if the beam is focused such that it intersects the foil in an ellipse of major axis 12.6 mm and a minor axis of 3 mm giving the beam a cross-sectional area of 29.8 mm$^2$; this zone of interaction will be essentially static in the time interval $\Delta t_{auger}$. During this time, the excited ions will occupy a volume of $v_{b\perp} \Delta t_{auger} \times 29.8$ mm$^2$ where $v_{b\perp}$ is the component of ion velocity perpendicular to the foil upon exiting the foil. Based on stopping power data, the ions may be expected to emerge with an energy of $\sim 9$ KeV at the average angle of 39°. Then $v_{b\perp} \simeq 1.32 \times 10^7$ cm/sec and the volume occupied by the N* particles is $\sim 1.1 \times 10^{-7}$ cm$^3$, giving an excited density of $\sim 0.79 \times 10^{14}$ cm$^{-3}$.

It is interesting to note that carrying the arguments through in general leads to an expression of the form $n^* = I_b c/8 ev_{b\|}\, v_{be}A_b$, where $v_{b\|}$ is the beam speed when parallel to the deflection plates (before deflection) and $v_{be}$ is the beam exit speed. The density of excited states calculated here may be taken as a measure of the inverted population density since most non-excited states will containe electrons in both the upper and lower levels. Furthermore, since the radiative lifetime is $\sim 2.8 \times 10^{-11}$ sec, the coherence length of the radiation (neglecting pulse shaping effects) is $\sim 8.4$ mm, and consequently the 12.6 mm length of active volume provided by the suggested pump geometry is sufficient for full amplification of the pulse.

For a radiative decay half-life of $2.8 \times 10^{-11}$ sec, the natural line width is $\Delta \nu_n \simeq 3.58 \times 10^{10}$ Hz. At the photon energy of 224 eV, the recoil broadening is only 3.6

× 10⁸Hz, entirely negligible. However, the Doppler broadening attributable to the spread in scattering angle should not be neglected. Since the scattering in angle closely approximates that due to a screened Coulombic interaction and the nature of the vacancy producing process is such that the probability of the process occurring rises very rapidly from zero to a fixed high value as the distance of closest approach decreases, the vacancy producing collisions may be estimated to scatter these ions into a cone of $\theta \sim 5°$ with a $d\theta$ between 3° and 4° (the angular spread needed for the scattered intensity to drop by a factor if $1/e$). Since the beam was incident at an angle 39.2°, one segment of the scattered cone will exit the foil within an angular spread from 30.7° to 34.2° thus leading to a spread in ion velocity in the direction parallel to the foil of $6.81 \times 10^5$cm/sec. This results in an inhomogeneous broadening of $1.23 \times 10^{12}$Hz. Then $\Delta v_{D\odot}/\Delta v_N$ 18 34.5.

Now, the fraction of excited particles that may be expected to lie within an angular spread of 3.5° from each other is $\sim \psi/\pi$ where $\cos \psi = \sin \theta / \sin(\theta + d\theta)$, and thus $\psi/\pi \sim \frac{1}{3}$. Accordingly, if the Doppler spread calculated above is to be used, the effective population inversion should be decreased by this same factor, giving $n^* \simeq 2.63 \times 10^{13}$cm$^{-3}$. Although the main branching ratio implied by fluorescent yield has been considered, branching ratios due to competing radiative decay modes have been neglected. However, previous spectroscopic work tends to indicate that a single inter-combination may be reasonably well expected to predominate.

Under the conditions outlined above, the negative absorption coefficient, given as $$\alpha_o = \frac{\sqrt{ln2}}{\pi} \frac{\lambda^2}{4\pi} \frac{A_{ij}}{\Delta v_D} (n_i - \frac{g_i n_j}{g_j})$$

for an inhomogeneously broadened line of wavelength $\lambda$, transition coefficient $A_{ij}$ for $i \rightarrow j$ transitions, respective densities of $n_i$ and $n_j$ with statistical weights $g_i$ and $g_j$, and inhomogeneous width $\Delta v_D$; becomes 0.873/m thus indicating a gain in excess of 3.79dB/meter. For a line of sight amplification path of length 2 meters, single pass gain factors of $\sim 5.73$ would result. Such amplification will be observed by virtue of the narrow beam angle of the amplified radiation which alone will permit it to be distinguished from spontaneous emission or other background radiation. Of course, one would also wish to evaluate the spectral distribution of the amplified output, which will also distinguish it as stimulated emission-amplified.

The choice of argon for the beam ions in the example explained above represents what may be considered to be a poor choice of ions with regard to the main branching ratio. In this respect the use of a neon ion beam incident on copper foil may advantageously be substituted for the above-described argon-carbon system.

For neon ion-copper atom collisions, level matching between the K shell of the neon ion and the L shell of copper results in high cross sections for selective vacancy production in these shells. Furthermore, it is believed that for K vacancy production, the vacancies are almost exclusively produced in the lower-Z collision partner. The fluorescence yield for neon ion impact on copper foil is at least an order of magnitude higher than for the argon-carbon case. Hence, there is good reason to believe that a significant output of 874-eV photons may be produced from a neon-copper apparatus at least as easily as the lower energy photons which would be produced in the argon-carbon apparatus described in detail above. The neon-copper aparatus need not differ materially from the apparatus described for argon-carbon excepting, of course, in respect to the ion beam being neon, and the foil being of copper.

Figure 4:
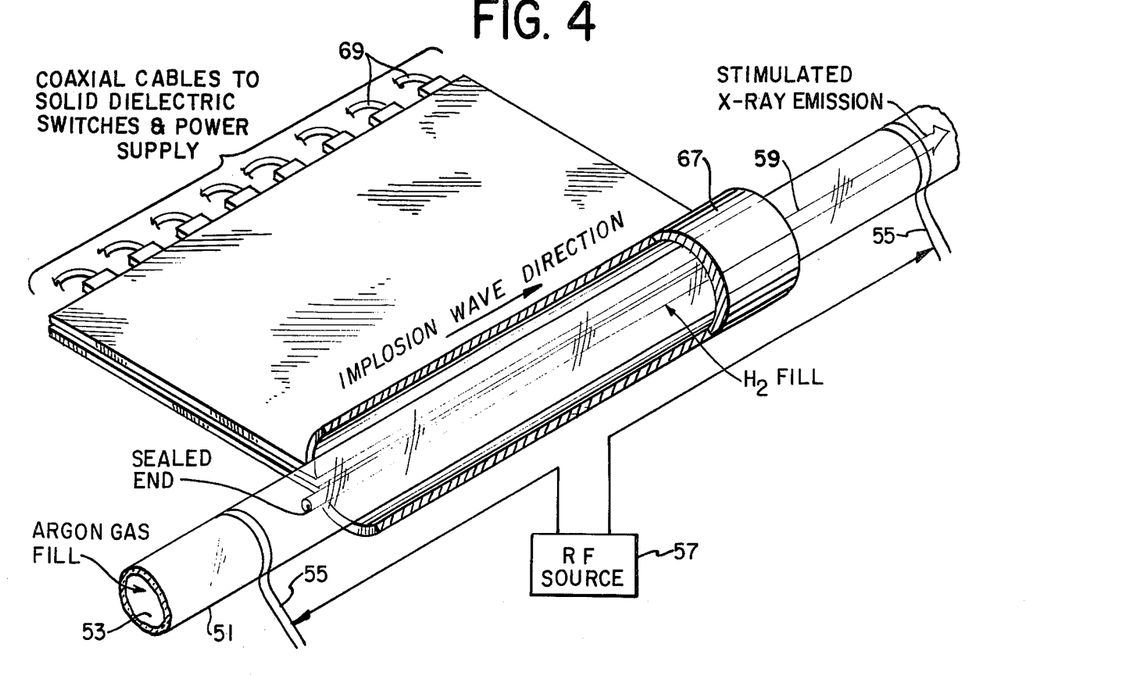
FIG. 4 is a perspective view, partially cut away, showing an alternative form of the invention, in which an interacting beam of ions is impacted on a cylindrical thin foil by a fast-rise theta-pitch geometry apparatus.
Figure 5:
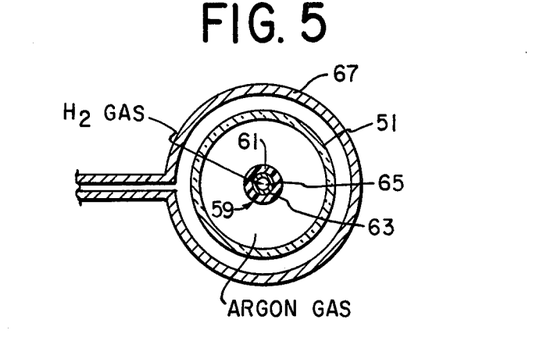
FIG. 5 is a sectional view of a portion of the apparatus in FIG. 4 shown in detail.

Referring to FIGS. 4 and 5, an alternative form of apparatus is shown for impacting ions at high current densities on a foil to produce a beam-foil interaction. The apparatus of FIGS. 4 and 5 is in certain respects simpler and more practical to construct than the apparatus of FIGS. 2 and 3.

In the apparatus of FIG. 4, a cylindrical enclosure 51 is filled with argon gas 53. The argon gas 53 is ionized by a radio frequency discharge in the gas. The radio frequency discharge may be produced in a conventional manner, as illustrated by the radio frequency electrodes 55 connected to a radio frequency source 57.

Located coaxially in the enclosure 51 is a separate enclosed cylindrical tube 59.

As may be better seen in FIG. 5, the tube structure 59 includes a thin-walled hydrocarbon tubing 61, which supports on its interior surface a thin foil of carbon which serves the same function as the foil 42 in FIG. 3. The center portion 65 of the enclosure 59 is hollow and is filled with gas, hydrogen for example.

The thickness of the foil 63 will be determined in accordance with the previous discussion of FIGS. 2 and 3. The thickness of the thin-walled hydrocarbon tubing will be minimized to the extent possible, consistent with structural integrity of the element 59. The hydrogen gas fill 65 helps to prevent collapse of the tube 61. The diameter of the hollow interior 65 of enclosure 59 will be such that in operation the volume is substantially filled with the stimulated emission medium. The diameter in a typical case may be on the order of tenths of a millimeter. The length of the enclosure 59 may be about 1 meter (or less if the system gain per unit length is high).

Surrounding the argon gas discharge enclosure 51 is an electric pulse apparatus including a cylindrical conductor 67 which is provided with a fast-rise traveling electrical pulse by coaxial cables 69. The coaxial cables 69 are of graduated lengths and are connected to solid dielectric switches and a pulse power supply now shown.

The construction and operation of the cylindrical conductor 67 fed by the coaxial cable 69, and the dielectric switches and power supply is not described in detail because this apparatus comprises a well-known fast-rise theta-pinch sequentially triggered form of plasma apparatus, described for example by J. D. Shipman, Jr. in Applied Physics Letters 10, 3 (1967).

The apparatus of FIGS. 4 and 5 causes the preionized argon plasma to be implosively collapsed on the coaxial enclosure 59 by a fast-rise theta-pinch effect. Furthermore, the pinch effect and hence the implosion wavefront travels at approximately the speed of light in the axial direction from left to right in FIG. 4.

As the ion implosion reaches a particular portion of the length of the coaxial enclosure 59, the ions penetrate the hydrocarbon tubing and the thin carbon foil, whereupon the argon ions undergo selective inner-shell vacancy production and the ions thus excited create a stimulated emission amplification medium in the interior 65 of the coaxial tube 59. The active region for amplification by stimulated emission travels in synchronism with a resonant X-ray pulse traveling through the center of the coaxial tube 59, thereby producing a highly directional X-ray output from the apparatus. The calculated gain for a state-of-the-art apparatus as illustrated in FIG. 4 is 4.3dB/cm. Thus a 10 cm. theta-pinch apparatus may be predicted to produce about 40 dB gain. The output from a stimulated emission amplifying medium without resonant cavity of the sort illustrated in FIG. 4 is referred to by some as superradiance. The highly directional output would permit the apparatus of FIG. 4 to be replicated to several stages with the output of one stage serving as an input to the next.

It should be noted that the apparatus of FIGS. 4 and 5 produces what is known as a beam-foil interaction in which the role of the beam is played by an implosion of a cylindrical volume of pre-ionized argon ions. Thus it will be understood that whenever the term beam is used herein, it will be understood to be used in the broadest sense, to mean a flow or pulse of particles or waves traveling at a high velocity in a controlled manner.

The apparatus of FIG. 4 and FIG. 5 has been described as using argon ions in conjunction with the carbon foil, so that the description of the operation of apparatus of FIGS. 4 and 5 may be closely relate and compared with the operation of the apparatus of FIGS. 2 and 3. It should be understood, however, that with the apparatus of FIGS. 4 and 5, as well as with the apparatus of FIGS. 2 and 3, other chemical elements may be employed as partners in the beam-foil interaction. As previously described, the beam may be of neon and the foil may be of copper. Alternatively, the argon ions may be impacted on an aluminum foil material or on titanium foil to supply the desired selective inner-shell vacancy production mechanism.

Utilizing the examples of FIGS. 1-5, the invention has been explained for clarity and simplicity in terms of a beam interacting with an interactant material; however, in certain forms of apparatus, this explanation needs to be modified. For example, apparatus according to the invention may employ plasma techniques wherein a cylindrical hollow plasma is implosively collapsed upon itself by the influence of an electric or magnetic field. As the opposite walls of the cylindrical plasma collide at near zero radius of the cylinder, highly excited particles are produced. These particles are capable of producing a traveling amplification region in accordance with the invention. In such apparatus, the previously described beam plug interactant material is replaced by a single plasma material. In the plasma case one might say that the plasma material serves as a swept beam which in effect interacts with itself. Accordingly, the scope of the invention should be understood to include the use of such plasma techniques for the production of a region of excited particles as being equivalent to the beams impinging on interactant materials described above in detail.

Figure 6:
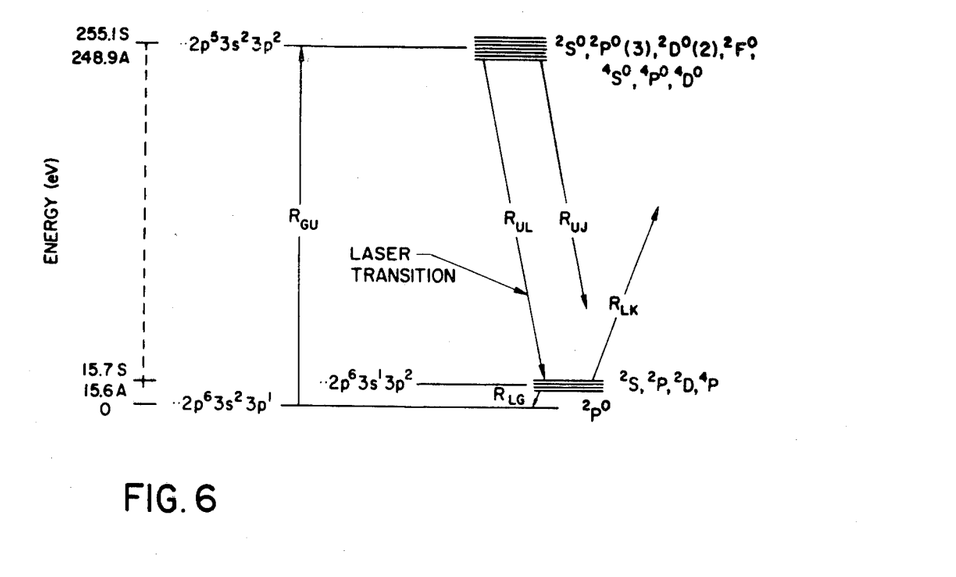
FIG. 6 is an energy-level diagram for $Ar^{+5}$ illustrating an excitation process in which a 2p electron is promoted to a 3p level to provide an upper laser level, and the lower laser level is formed by a 2p-3s transition.

Considerable aid in evaluting inversion processes to achieve particular objectives is provided by the pertinent rate equations. Although inversions might be produced by electron impact, photoionization, or recombination, only inversion due to ion-atom collisions will be treated in the following analysis. Two distinct reaction environments are considered; volume reaction and beam-foil excitation. A three-level scheme is considered. Referring to FIG. 6, there is shown an energy level diagram for $Ar^{+5}$. A 2p electron is promoted to a 3p level to provide an upper laser level. The lower laser level is reached by a 2p-3s transition.

For volume reaction, $$\frac{dNa_U}{dt} = Na_G R_{GU} - Na_U(R_{UL} + \sum_j R_{Uj}),$$

$$\frac{dNa_L}{dt} = Na_U R_{UL} - Na_L(R_{LG} + \sum_k R_{Lk}),$$

where pumping is on particles $\alpha$ of density $N_{\alpha G}$ in the ground state, $N_{\alpha U}$ in the upper state of interest, and $N_{\alpha L}$ in the lower state of interest. $N_{\alpha G}$ is taken as constant throughout and $N_{\alpha U} = N_{\alpha L} = 0$ initially. Such a system has been considered for a rapidly rising pump [pump risetime $\ll (R_{UL} + \Sigma_j R_{Uj})^{-1}$] and a linearly rising pump ($r_{GU} \sim R_{GU} t$). For inner-shell vacancy production by ion-ion collisions in a high-velocity counterstreaming plasma, $R_{GU} \sim t_{ii}^{*-1}$. Depopulation of the upper level is by spontaneous and stimulated decay to the lower level, branching to other states due to Auger (and possibly Coster-Kronig) processes, further excitation and ionization by electron impact, radiative and collisional recombination, large-angle scattering of the ions of interest and further ion-ion inner-shell vacancy production. Thus, $$R_{UL} + \sum_j R_{Uj} \sim t_{r,UL}^{-1} + t_{s,UL}^{-1} + t_{\pi U}^{-1} + t_{ei}^{-1} + t_{ei}^{I-1} +$$

$$t_{\pi}^{-1} + t_{e\tau}^{-1} + t_{\theta_{II}}^{-1} + t_{\pi}^{-1} + t_{ii}^{-1}.$$

Population of the lower level from the upper state includes spontaneous and stimulated decay;

$$R_{UL} \sim t_{r,UL}^{-1} + t_{s,UL}^{-1}.$$

Finally, $$R_{LG} + \sum_k R_{Lk} \sim t_{r,LG}^{-1} + (\omega' t_{r,LG})^{-1} + t_{TWP}^{-1} + t_{d}^{*-1} +$$

$$t_{ei}^{-1} + t_{\pi}^{-1} + t_{e\tau}^{-1} + t_{\theta_{II}}^{-1} + t_{ii}^{-1}$$

where, in addition to previously described times, depopulation of the lower level includes nonradiative decay (due to rearrangements in the M shell for the example chosen) estimated by a fluorescence yield $\omega'$, and an effective lifetime due to utilization of a traveling wave pump. Nonradiative decay (and perhaps shakeup decay) as well as quenching by electron impact (with the outermost electrons) of the lower level of interest may be sufficiently rapid to allow cw-type operation. Such possibilities are attractive features of pumping with an inner-shell vacancy production mechanism (in contrast to systems for which pumping is on optical-like outer shells).

To compare rates, an example is chosen for which $Ar^{+5}$ predominates; $T_e \sim 10$eV, and consequently $\sigma_{PI} \sim 2.4 \times 10^{-19}$ cm$^2$. A competitive stimulated emission time of $\sim 3 \times 10^{-12}$ sec requires $\alpha \sim 10$ cm$^{-1}$, and since $\sigma_{SN} \sim 10^{-16}$ cm$^2$, an inversion density of $\sim 10^{17}$ cm$^{-3}$ is needed. In order for stimulated emission to predominate over nonresonant absorption, $\Delta N/N_i$ $\sigma\lambda_{PI}/\sigma_{SN} \sim 2.4 \times 10^{-3}$, and thus $N_i$ $4 \times 10^{19}$ cm$^{-3}$ and $N_e \sim Z_i N_i \sim 2 \times 10^{20}$ cm$^{-3}$. For dynamical plasmas with streaming speeds of 2-3 $\times 10^7$ cm/sec, counterstreaming ion energies are equivalent to 30-70 keV in terms of beam-foil systems. Then the reaction time estimates given previously become relevant. It is seen that (with $t_{r,LG} \sim 1.52 \times 10^{-10}$ sec)

$R_{GU} \sim 2.85 \times 10^{11}\, \text{sec}^{-1}$ $R_{UL} + \sum_k R_{Uk} \sim t_{\pi U}^{-1} \sim 0.9 \times 10^{13}\, \text{sec}^{-1}$, $R_{UL} \sim t_{s,UL}^{-1} \sim 3 \times 10^{11}\, \text{sec}^{-1}$, and $R_{LG} + \sum_k R_{Lk} \sim (\omega' t_{r,LG})^{-1} + t_{ei}^{*-1}$ $\sim (\omega' 1.52 \times 10^{-19})^{-1} + (7.2 \times 10^{-13})^{-1}$ $1.39 \times 10^{12}\, \text{sec}^{-1}$.

Then $\frac{dN\alpha_U}{dt} \simeq N\alpha_G(N\alpha_G \sigma_{ii}^* v_{ir}) - \frac{N\alpha_U}{t_{AU}}$, $\frac{dN\alpha_L}{dt} \simeq \frac{N\alpha_U}{t_{s,UL}} - \frac{N\alpha_L}{t_{ei}^*}$.

At counterstreaming speeds of interest here, the plasma overlap increases by $\sim 5 \times 10^{-6}$ cm during the decay time of the upper state. Since this value is smaller than typical macroscopic density variation distances, the rate equations should be considered during both the pump risetime and the time of steady-state pumping. For a linearly rising pump, since $b = R_{UL}\,(R_{UL} + \Sigma_j R_{Uj})^{-1} \sim 3.3 \times 10^{-2} << 1$ (note also that $R_{LG} + \Sigma_k R_{Lk} \sim R_{UL} + \Sigma_j R_{Uj}$), the equilibrium inversion density is approached in a time on the order of the plasma density risetime and is held at this value;

$\Delta N \sim (N_{\alpha U} - N_{\alpha L})_{eq} = N^2 \alpha_G \sigma_{ii} v U_{ir} t_{AU}(1 - t_{ei} v/t_{s,UL})$
$\sim N_{\alpha G}^2 \sigma_{ii}^{.98} U_{ir} t_{AU}$.

This estimate indicated the inversions achievable from volume reactions. (As a matter of self-consistency, for the case chosen, $\Delta N/N_{\alpha G} \sim N_{\alpha G} \sigma_{ii} v \times v_{ir} t_{AU} \sim 2.4 \times 10^{-2}$, which, with a branching estimate of $\sim 0.1$ discussed below, gives the assumed $\Delta N/N_i \sim 2.4 \times 10^{-3}$.) Thereshold requirements for volume reaction are nos $N_j^2 \sigma_{ii} v U_{ir} t_{AU}\quad (1 + K_r L)/\sigma_r L$.

For the case of beam-foil excitation, consider ions incident normally on a foil of thickness $\delta$ (smaller than the range R of the ions in the foil material) and particle density $N_f$.

TABLE I

| PROBABILITY OF: | |
|---|---|
| EXCITATION IN x TO x + dx | $N_f \sigma^*(x) dx$ |
| REACHING x WITHOUT EXCITATION | $\exp(-\int_0^x N_f \sigma^*(s) ds)$ |
| REACHING $\delta$ FROM x BEFORE DECAY | $\exp(-\int_x^\delta [v(s) \tau^*(s)]^{-1} ds)$ |
| REACHING $\delta$ FROM x BEFORE SECOND COLLISION | $\exp(-\int_x^\delta N_f \sigma(s) ds)$ |

Figure 7:
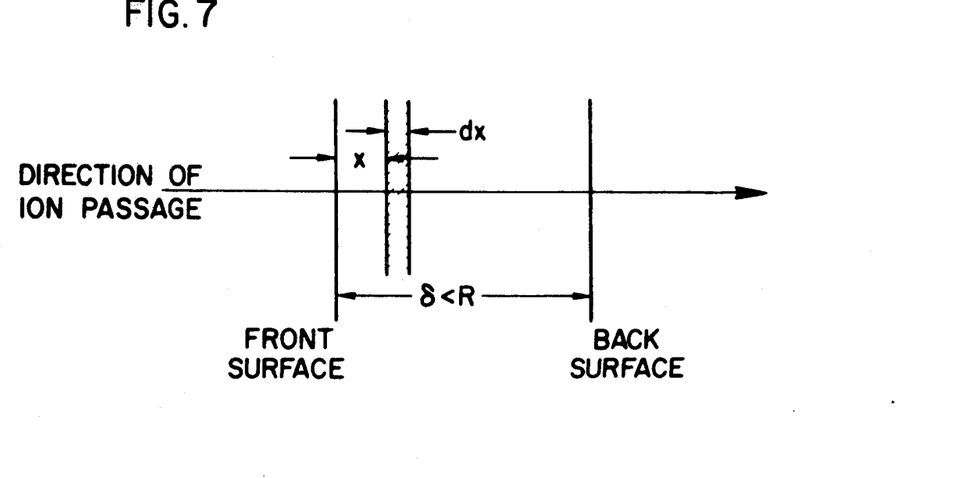
FIG. 7 is an illustration useful in explaining estimates of single excitations for beam-foil geometry.

Referring to FIG. 7 and the above table of probabilities, with an effective cross section for excitation $\sigma v$, the probability for a singly excited ion emerging from the back surface of the foil per incident ion is $F \sim N_f \exp(-\int_0^\delta N_f \sigma^*(s) ds) \int_0^\delta dx \sigma^*(x)$ $\times \exp(-\int_x^\delta [v_i(s)\tau^*(s)]^{-1} ds)$.

$\tau^*$ is the excitation lifetime and $v_i$ is the ion speed. Since the exponential in the integrand is small unless $(\delta - x) < v_i(x) \tau^*(x)$, the probability may be estimated conservatively as $F \geq N_f \sigma^* v_i \tau^* e^{-N_f \sigma^* \delta}(1 - e^{-\delta/v_i \tau^*})$, for which quantities are evaluated at the exit side of the foil. Fractional excitation is optimized by choosing a foil thickness of $v_i \tau^* \ln(1 + 1/N_f \sigma^* v_i \tau^*)$, for which $F \geq (1 + 1/N_f \sigma^* v_i \tau^*)^{-(1+N_f \sigma^* v_i \tau^*)}$.

Due to angular scattering of the excited particles into a cone with angular spread from $\theta$ to $\theta + d\theta$ to the foil normal, only the fraction $\psi/\pi$, where $\cos\psi = \sin\theta/\sin(\theta + d\theta)$, will emerge from the foil excited and having trajectories lying within an angular spread $d\theta$ from each other. Thus the fractional excitation considered to be of interest is of order $F\psi/\pi$ giving an inversion density of $\sim (F\psi/\pi)N_o$ for an incident ion density $N_o$.

For typical ion-atom cross sections at ion speeds of interest, identifying $\tau v$ as the Auger lifetime of the state of interest and taking reasonable values for the angular scattering reveals that a fractional excitation $F\psi/\pi$, of $\sim 0.1$ is realizable. Thus, the relevant loss mechanisms mentioned earlier are seen to be easily overcome without detailed evaluation. However, if lasing is to occur parallel to the foil surface, diffraction losses may become significant since the effective thickness of pumping is $\sim V_i t_A$, which may be quite small. Also, as previously, observed, strong requirements are now placed on the planarity of the foil. Accordingly, comparison of alternative inversion and amplification processes should include consideration of diffraction loss. Although some focusing of the radiation may occur due to the rapid variation of the index of refraction with distance normal to the surface, this effect is small. The effective loss coefficient due to diffraction is taken, in cognizance of a high reflection coefficient by the foil for soft X-rays at large angles of incidence, as $\alpha_{eff,D} \approx \frac{1}{Z} \ln\left(\frac{\lambda Z}{2 v_i^2 t_A^2}\right)$ for $Z \geq \frac{2 v_i^2 t_A^2}{\lambda}$ $\approx 0$ \qquad for $Z < \frac{2 v_i^2 t_A^2}{\lambda}$.

The threshold requirement becomes $N_o \geq \frac{\pi}{F\psi} \frac{\left[1 + \ln\left(\frac{\lambda L}{2 v_i^2 t_A^2}\right)\right]}{\sigma_r L}, Z \geq \frac{2 v_i^2 t_A^2}{\lambda}$.

some reduction of inversion density estimates due to distributions in charge states as well as distributions over excited states in the inner and outer shells is in order. Charge state distributions may, in some cases, reduce inversion estimates by no more than a factor of $\sim \frac{1}{2}$ since for dense plasmas a reasonable characterization by local thermal equilibrium or coronal equilibrium suggests the predominance of two-, and in some cases, one-charge states. For the beam-foil case, similar conclusions are in order. Assuming energy of relative motion for collisions of interest is below a realizable value, the lower level from the ground state sufficiently unlikely.

TABLE II

Stimulated emission cross sections and threshold power densities.

| Dominant line-broadening process | Stimulated emission$^a$ cross section | Threshold power density (W/cm$^3$) |
|---|---|---|
| Auger decay | $\dfrac{\pi \times 10^{-16}\omega\lambda^2}{(1 + \dfrac{\tau_u}{\tau_L})} \simeq \pi \times 10^{-16}\omega\lambda^2$ | $\dfrac{5 \times 10^{18} f (1 + K\upsilon L)}{3\epsilon\omega^2\lambda^5 L}$ |
| Doppler effect | $10^{-16} f\lambda (\dfrac{A_i}{T_i})^{\frac{1}{2}}$ | $\dfrac{4 \times 10^{17}(1 + K\upsilon L)}{3\epsilon\omega\lambda^4 L} \left(\dfrac{T_i}{A_i}\right)^{\frac{1}{2}}$ |
| Ion impact | $\dfrac{10^6 f S_e^2 (\dfrac{A_i}{V_i})^{\frac{1}{2}}}{6\pi^2 \eta_u^2 Z_i^2 N_i (1 - \dfrac{N_{e0}}{S_e})^2}$ | $\dfrac{4 \times 10^{11}\eta_u^2 Z_i^2 N_i (1 - \dfrac{N_{e0}}{S_e})^2}{\epsilon\omega S_e^2 \lambda^2 L} \left(\dfrac{V_i}{A_i}\right)^{\frac{1}{2}} (1 + K\upsilon L)$ |

$^a$All units cgs except for temperatures (eV) and wavelength (in A)

the production of a single inner-shell vacancy may be expected. Moreover, althrough the $L_1$, $L_2$, $L_3$ separation is greater than the line broadening envisioned (for the argon case), the production of an $L_1$ vacancy may be expected to be transferred to an $L_{2,3}$ vacancy by Coster-Kronig transitions before or in competition with Auger decay. The violence of ion-atom collisions at intermediate energies is known to produce multiple excitations in the outer electronic shells leading to complicated Auger spectra. Apart from possible autoionizing states in the M shell that should decay early, M-shell excitations in argon will cause a spread in the 2p-3s transition of interest that may be estimated to fall within the shift of this transition between the relevant consecutive stages of ionization. A consideration of all these effects leads to the conclusion that, realistically, an order of magnitude should be sacrificed in the above estimates of inversion density (an estimate in accord with relevant Auger spectra). Moreover, it should be mentioned that omission of allowances for pumping of the lower laser level by collisions from the ground state in the rate equations is due to the violence of the ion-atom-ion collisions of interest. Extensive M-shell excitation simultaneous with the L-shell vacancy production leads to both upper and lower laser levels being appreciably shifted in energy from the case of little or no M-shell excitation, thus making direct collisional excitation of the lower level from the ground state sufficiently unlikely.

A summary of threshold conditions with these more realistic estimates is given in Table III. These may be compared with the stimulated emission cross sections and thershold power densities for amplified spontaneous emission in Table II.

TABLE III

| Dominant line-broadening process | Threshold requirement |
|---|---|
| | Volume reaction |
| Auger decay | $N_i \geq \dfrac{9.16}{\omega\lambda^2} \left(\dfrac{f(1 + K\upsilon L)}{\sigma_{ii}^* \upsilon_{ir} L}\right)^{\frac{1}{2}}$ |
| Doppler effect | $N_i \geq \dfrac{2.6 \times 10^4}{\lambda^{3/2}} \left(\dfrac{T_i}{A_i}\right)^{\frac{1}{4}} \left(\dfrac{1 + K\upsilon L}{\omega\sigma_{ii}^* \upsilon_{ir} L}\right)^{\frac{1}{2}}$ |
| Ion impact | $N_i \geq \dfrac{(1 + K\upsilon L)}{\omega\sigma_{ii}^* \upsilon_{ir} L} \left(\dfrac{V_i}{A_i}\right)^{\frac{1}{2}} \left[\dfrac{\eta_u Z_i}{50\lambda S_e} \left(1 - \dfrac{N_{e0}}{S_e}\right)\right]^2$ |
| | Beam Foil |
| Auger decay | $N_0 \geq \dfrac{10[1 + \ln(\dfrac{f^2 L}{4.5\omega^2 v_i^2 \lambda^3})]}{F\psi\omega\lambda^2 L}$ |
| Doppler effect | $N_0 \geq \dfrac{\pi \times 10^9}{F\psi\lambda f L} \left(\dfrac{T_i}{A_i}\right)^{\frac{1}{2}} \left(1 + \ln\dfrac{f^2 L}{4.5\omega^2 v_i^2 \lambda^3}\right)$ |
| Ion impact | $L \geq \dfrac{6\pi^3 \times 10^{-5}}{F\psi f (\dfrac{A_i}{V_i})^{\frac{1}{2}}} \left(\dfrac{\eta_u Z_i}{S_e}\right)^2 \left(1 - \dfrac{N_{e0}}{S_e}\right)^2 \left(1 + \ln\dfrac{f^2 L}{4.5\omega^2 v_i^2 \lambda^3}\right)$ |

Caution must be exercised in scaling from these expressions in that $K_\upsilon$ depends on $N_i$.

The volume-reaction case is reexamined here for threshold, as given in Table III. At the counterstreaming speeds of $\sim 4.4 \times 10^7$ cm/sec of interest here, initially cold streaming ions will "thermalize" to a temperature $\sim$keV in approximately $10^{-10}$ sec. Although lasing over distances of several centimeters may occur during this time, estimates of ion temperatures below $\sim 100$ eV are probably unrealistic. Assuming that ion densities are lower than $1.4 \times 10^{20}$ cm$^{-3}$, Doppler broadening is dominant for $T_i \sim 400$eV. Then, for K,L $\gg$ 1, threshold occurs for $$N_i \sim \dfrac{6.75 \times 10^8 \sigma_{PI}}{\omega\sigma_{ii}^* \upsilon_{ir} \lambda^e} \left(\dfrac{T_i}{A_i}\right)^{\frac{1}{2}} \sim 1.07 \times 10^{20}\,\text{cm}^{-3},$$

independent of the axial extent of the region pumped. Here, $\Delta N \sigma_s \sim 26.8$ cm$^{-1}$ and a slight increase in ion density, by a factor of $\sim 1.25$, provides a net gain coefficient of $\sim 10$ cm$^{-1}$. In this case, $N_i \sim 1.34 \times 10^{20}$ cm$^{-3}$, and ion-impact broadening is beginning to be appreciable. (It is noted that in the Doppler limit, $\Delta N\sigma_s \sim N_i^2$, whereas $\Delta N\sigma_s \sim N_i$ in the ion-impact case.) Since the threshold density is independent of the length of the pumped region (because of absorption) and a slight increase of density above threshold provides large gain per unit length, pumping over distances greater than about 1 to 10 cm is seen as impractical as a result of difficulties in obtaining dense plasmas in large geometries.

For beam-foil excitation, argon ions incident on a titanium foil should result in appreciable pumping. A fractional argon excitation, $F\psi/\pi$, of $\sim 0.1$ is to be expected on the downstream side of the foil. For a streaming energy $eV_o$, an effective temperature of order $eV_o\cdot \sin^2\theta[(\cos\psi)^{-1}1]^2$ results due to angular scattering. Ignoring initial thermal spread, Doppler broadening is dominant over natural broadening. At ion speeds $\sim 5 \times 10^7$ cm/sec, diffraction losses are considerable and threshold occurs for $N_o \sim 3.5 \times 10^{19} L^{-1}$ cm$^{-3}$. For the limit in which ion-impact broadening is dominant, threshold appears to be independent of ion density from Table III. This conclusion is subject to the requirements $Y\nu_{ci} > \delta\nu_D$, however. Then $$N_o \geq \frac{10^6 f S_e^2 (\frac{V_i}{A_i})^{\frac{1}{2}}}{1.5\pi\omega\lambda^2 n_{ir}^2 Z_i^2 (1 - \frac{N_{e0}}{S_e})^2}$$

and $$N_o \geq \frac{2.3 \times 10^{12} S_e^2 (V_i T_i)^{\frac{1}{2}}}{\lambda A_i n_{ir}^2 Z_i^2 (1 - \frac{N_{e0}}{S_e})^2}.$$

This requires ion desities in excess of $3 \times 10^{18}$ cm$^{-3}$ and $1.4 \times 10^{19}$ cm$^{-3}$, respectively, for Ar$^{+5}$. Thus, operation in this regime is at densities below threshold for the Doppler broadened case unless $L > 2.5$ cm. Moreover, since the net gain coefficient in this limitis independent of ion density ($\alpha_{eff} = L_c^{-1}$ with $L_c$ taken from Table III), such a regime represents an upper bound on achievable gain per unit length. A traveling wave pump to provide a large L, thus allowing treshold to be reached at ion densities below that for which ion-impact broadening becomes dominant, is of considerable advantage in this case.

Of interest for use in achieving stimulated emission under various of the conditions evaluated above are plasma experimental facilities recently reported in Nuclear Fusion 13, P. 458, (1973) (with possible modifications to obtain either counterstreaming or beam-foil-type behavior). The use of argon in such systems may not be necessarily the most judicious choice.

From the foregoin description and explanation, it will be understood that apparatus according to present invention constitutes a notably practical apparatus for generating X-ray emission by stimulated emission of radiation, which will have the property of controlled directiveity in a high degree, as well as other useful properties associated with radiation generated by the phenomenon of stimulated emission. It will be understood that the particular examples are presented by way of illustration only, and that the scope of the invention is not limited to the particular examples described, but is rather to be determined by reference to the appended claims.

Whatis claimed is:

1. An X-ray wavelength generator comprising:
   a volume of material capable of a high energy density interaction to produce particles capable of emitting radiation at X-ray wavelength; and
   means for causing a swept high energy density interaction in a continuous path along said material traveling at approximately the speed of light to cause excited particles to be present in a region in convergence with said material;
   thereby producing in the region a medium for non-isotropic X-ray generation through said region.

2. Apparatus as claimed in claim 1 wherein said interation is swept along a straight line.

3. An X-ray wavelength generator comprising:
   a volume of material capable of a high energy density interaction to produce particles capable of emitting radiation at X-ray wavelength; and
   means for causing a swept high energy density interaction, consisting of collisions between mass particles at least a portion of which are pre-ionized, along said material traveling at approximately the speed of light to cause excited particles to be present in a region in convergence with said material;
   therby producing in the region a medium for non-isotropic X-ray generation through said region.

4. An X-ray wavelength generator comprising:
   a volume of material capable of a high energy density interaction to produce particles capable of emitting radiation at X-ray wavelength; and
   means for causing a swept high energy density interaction, consisting of collisions between mass particles at least a portion of which are pre-ionized, along said material traveling at approximately the speed of light to cause excited particles to be present in a region in convergence with said material, said means comprising means for imparting a high velocity to said pre-ionized mass particles;
   thereby producing in the region a medium for non-isotropic X-ray generation through said region.

5. An X-ray wavelength generator comprising:
   a volume of material capable of a high energy density interaction to produce ions with inner-shell vacancies capable of emitting stimulated radiation at X-ray wavelength; and
   means for causing a high energy density interaction to be swept along said material at approximately the speed of light to cause said ions to be present in a region in convergence with siad material;
   thereby producing in the region a medium for non-isotropic X-ray generation through said region.

6. Apparatus as claimed in claim 5 wherein said interaction is swept along a straight line.

* * * * *

UNITED STATES PATENT AND TRADEMARK OFFICE
CERTIFICATE OF CORRECTION

PATENT NO. : 4,042,827

DATED : August 16, 1977

INVENTOR(S) : Dr. Richard A. McCorkle and Dr. James M. Joyce

It is certified that error appears in the above–identified patent and that said Letters Patent are hereby corrected as shown below:

Column 7, line 38, should read: 5 $\mu g/cm^2$ /sin $\alpha$, or 7.79 $\mu g/cm^2$ ; line 45, the formula should read: $N = N_o e^{-x/\lambda}$; line 46, the formula should read: $\lambda = 1/N_{f\sigma}*$; line 68, the formula should read: $t_b = t_{bm} = v_b \tau \ln(1 + \lambda/v_b \tau)$. Column 8, line 1, the formula should read: $\sigma^*_{Ar^+ onC} = 0.795 \times 10^{-18} cm^2$; line 3, the formula should read: $t_{bm} \simeq 8.6 \mu g/cm^2$. Column 12, line 29, the formula should read:

$$R_{UL} + \sum_j R_{Uj} \sim t^{-1}_{r,UL} + t^{-1}_{S,UL} + t^{-1}_{AU} + t^{*-1}_{ei} + t^{I-1}_{ei}$$
$$+ t^{-1}_{rr} + t^{-1}_{cr} + t^{-1}_{\theta ii} + t^{-1}_{ii} + t^{*-1}_{ii}$$

line 40, the formula should read:

$$R_{LG} + \sum_k R_{Lk} \sim t^{-1}_{r,LG} + (\omega' t_{r,LG})^{-1} + t^{-1}_{TWP} + t^{*-1}_{ei}$$
$$+ t^{I-1}_{ei} + t^{-1}_{rr} + t^{-1}_{cr} + t^{-1}_{\theta ii} + t^{*-1}_{ii}$$

Column 13, lines 35-36, the formula should read:

$$\Delta N \sim (N_{\alpha U} - N_{\alpha L})_{eq} = N^2_{\alpha G} \sigma^*_{ii} v_{ir} t_{AU} (1 - t^*_{ei}/t_{S,UL})$$
$$\sim N^2_{\alpha G} \sigma^*_{ii} v_{ir} t_{AU} .$$

line 45, the formula should read: $N^2_i \sigma^*_{ii} v_{ir} t_{AU} \lesssim (1 + K_v L)/\sigma_s L$ .

Columns 15 and 16, Table II, in first formula, "$\lambda^2$" should read --$\bar{\lambda}^2$--, two occurrences; Table III, fourth formula, "$\lambda^2$" should read --$\bar{\lambda}^2$--; column 16, line 60, "$\lambda^e$" should read --$\lambda^3$--.

UNITED STATES PATENT OFFICE
CERTIFICATE OF CORRECTION

Patent No. 4,042,827        Dated August 16, 1977

Inventor(s) Richard A. McCorkle et al.

It is certified that error appears in the above-identified patent and that said Letters Patent are hereby corrected as shown below:

Column 18, line 32, "therby" should read -- thereby --.

Signed and Sealed this

Twenty-first Day of March 1978

[SEAL]

Attest:

RUTH C. MASON
Attesting Officer

LUTRELLE F. PARKER
Acting Commissioner of Patents and Trademarks